(12) United States Patent
Lutes et al.

(10) Patent No.: US 7,421,151 B2
(45) Date of Patent: Sep. 2, 2008

(54) ESTIMATION OF COEFFICIENTS FOR A RATIONAL POLYNOMIAL CAMERA MODEL

(75) Inventors: James Anthony Lutes, Westminster, CO (US); Jacek Franciszek Grodecki, Thornton, CO (US)

(73) Assignee: Orbimage SI OPCO Inc., Dulles, VA (US)

( * ) Notice: Subject to any disclaimer, the term of this patent is extended or adjusted under 35 U.S.C. 154(b) by 729 days.

(21) Appl. No.: 10/849,276

(22) Filed: May 18, 2004

(65) Prior Publication Data

US 2005/0259890 A1 Nov. 24, 2005

(51) Int. Cl.
*G06K 9/32* (2006.01)
*G06K 9/36* (2006.01)
*G06T 15/00* (2006.01)

(52) U.S. Cl. .................. 382/294; 382/285; 345/419

(58) Field of Classification Search .............. 382/293, 382/294
See application file for complete search history.

(56) References Cited

U.S. PATENT DOCUMENTS

| | | | |
|---|---|---|---|
| 4,951,136 A * | 8/1990 | Drescher et al. ............ | 348/145 |
| 5,550,937 A * | 8/1996 | Bell et al. .................. | 382/293 |
| 6,442,293 B1 * | 8/2002 | Ito et al. .................... | 382/154 |
| 6,661,931 B1 * | 12/2003 | Kawada .................... | 382/276 |
| 7,236,646 B1 * | 6/2007 | Horne ....................... | 382/284 |
| 2003/0044085 A1 | 3/2003 | Dial, Jr. et al. | |

OTHER PUBLICATIONS

Yamaguchi et al., "Overview of Advanced Spaceborne Thermal Emmision and Reflection Radiometer (ASTER)", IEEE Transactions on Geoscience and Remote Sensing, vol. 36, No. 4, Jul. 1998, pp. 1062-1071.*

(Continued)

*Primary Examiner*—Jingge Wu
*Assistant Examiner*—Jose M Torres
(74) *Attorney, Agent, or Firm*—Fennemore Craig, P.C.

(57) ABSTRACT

One aspect of the invention is embodied in a number of machine-readable media having stored thereon sequences of instructions which, when executed by a machine, cause the machine to perform a number of actions. The actions include, for each of a plurality of image space coordinates of a camera image, retrieving 1) a corresponding camera position, and 2) corresponding object space coordinates on an object surface that is represented by the camera image. Then, for each of a plurality of height surfaces (chosen with respect to the object surface), a grid coordinate defined by an intersection between the height surface, and a line extending between the camera position and the object space coordinates, is determined. The determined grid coordinates are then associated with their corresponding image space coordinates. Finally, coefficients for a rational polynomial camera model are estimated by fitting rational polynomials to at least the grid coordinates and image space coordinates.

19 Claims, 5 Drawing Sheets

OTHER PUBLICATIONS

Welch et al., "ASTER as a Source for Topographic Data in the Late 1990's", IEEE Transactions on Geoscience and Remote Sensing, vol. 36, No. 4, Jul. 1998, pp. 1282-1289.*

Jacek Grodecki, et al., "Block Adjustment of High-Resolution Satelite Images Described by Rational Polynomials", Photogrammetric Engineering & Remote Sensing, Jan. 2003, vol. 69, No. 1, pp. 59-68.

Frank Gerlach, "Understanding Rational Polynomial Coefficients and Image Geometry Models", Imaging Notes, www.imaging notes.com, Nov./Dec. 2001, 4 pages.

Richard Hartley, et al., "The Cubic Rational Polynomial Camera Model", www.cs.albany.edu, Sep. 11, 2000, pp. 1-11.

C. Vincent Tao, et al., "Photogrammetric Exploitation of Ikonos Imagery Using the Rational Function Model", ACSM-ASPRS 2002 Annual Conference Proceedings, 12 pages.

* cited by examiner

ESTIMATION OF COEFFICIENTS FOR A RATIONAL POLYNOMIAL CAMERA MODEL

BACKGROUND

Physical camera models are used to represent the geometric relationship between the positions of objects in an image (image space coordinates) and the corresponding positions of the objects in real space (object space coordinates). To create a physical model for a camera, details such as the focal length, principal point location, lens distortion, and other factors must be known about the camera. In some cases, this information is proprietary information that is not readily available to the public. Additionally, these models may be highly complex mathematical models that require a great deal of effort to implement in software packages, such as software packages used to perform photogrammetric processing (e.g., software to generate Digital Elevation Models or topographical maps).

An alternate sensor model that may be used instead of a physical camera model is the Rational Polynomial Camera (RPC) Model. The RPC Model is a generic sensor model that can be used with a wide range of sensors. Additionally, it is widely supported in commercial software packages. However, the use of the RPC model requires values for a set of coefficients used in the model. These coefficients are generated using the physical camera model. Thus, to use the RPC model, either 1) the physical camera model (or knowledge of the interior configuration of the sensor) must be known, or 2) the coefficients used in the model must be provided by the camera manufacturer.

SUMMARY OF THE INVENTION

One aspect of the invention is embodied in a number of machine-readable media having stored thereon sequences of instructions which, when executed by a machine, cause the machine to perform a number of actions. The actions comprise, for each of a plurality of image space coordinates in a camera image, retrieving 1) a corresponding camera position, and 2) corresponding object space coordinates on an object surface that is represented by the camera image. Then, for each of a plurality of height surfaces (chosen with respect to the object surface), a grid coordinate defined by an intersection between the height surface, and a line extending between the camera position and the object space coordinates, is determined. The determined grid coordinates are then associated with their corresponding image space coordinates. Finally, coefficients for a rational polynomial camera model are estimated by fitting rational polynomials to the grid coordinates and image space coordinates.

Another aspect of the invention is also embodied in a number of machine-readable media having stored thereon sequences of instructions which, when executed by a machine, cause the machine to perform a number of actions. The actions comprise, for each of a plurality of image space coordinates in a camera image, retrieving 1) a corresponding camera position, and 2) a line-of-sight vector from the camera position toward an object surface that is represented by the camera image. Then, for each of a plurality of height surfaces (chosen with respect to the object surface), a grid coordinate defined by an intersection between the height surface and the line-of-sight vector is determined. The determined grid coordinates are then associated with their corresponding image space coordinates. Finally, coefficients for a rational polynomial camera model are estimated by fitting rational polynomials to the grid coordinates and image space coordinates.

Other embodiments of the invention are also disclosed.

BRIEF DESCRIPTION OF THE DRAWINGS

Illustrative and presently preferred embodiments of the invention are illustrated in the drawings, in which.

DESCRIPTION OF AN ILLUSTRATIVE EMBODIMENT

Terra is a satellite launched in December 1999 as part of the National Aeronautics and Space Administration's (NASA's) Earth Observing System (EOS). The Terra satellite hosts five different instruments that aid scientists in studying interactions among the Earth's atmosphere, lands, oceans, life, and radiant energy (heat and light). Of Terra's five instruments, the Advanced Spaceborne Thermal Emission and Reflection Radiometer (ASTER) instrument captures Terra's highest resolution image data. The ASTER instrument uses three subsystems to collect image data in fourteen spectral bands. A first of the subsystems captures image data for three visible and near-infrared (VNIR) bands, at a pixel resolution of fifteen meters; a second of the subsystems captures image data for six Shortwave Infrared (SWIR) bands, at a pixel resolution of thirty meters; and a third of the subsystems captures image data for five thermal infrared (TIR) bands, at a pixel resolution of ninety meters.

ASTER's VNIR subsystem is a pushbroom sensor with two independent telescope assemblies. One of the assemblies is a nadir-looking telescope that collects image data in the green, red, and near IR bands. The other assembly is a backward-looking telescope that collects image data in the same near IR band as the nadir telescope. The nadir and backward-looking telescope are used to collect-same-orbit stereoscopic coverage in the near IR band. This stereoscopic coverage can then be used to extract 3-dimensional (3D) features and Digital Elevation Models (DEMs) from the image data.

Figure 1:
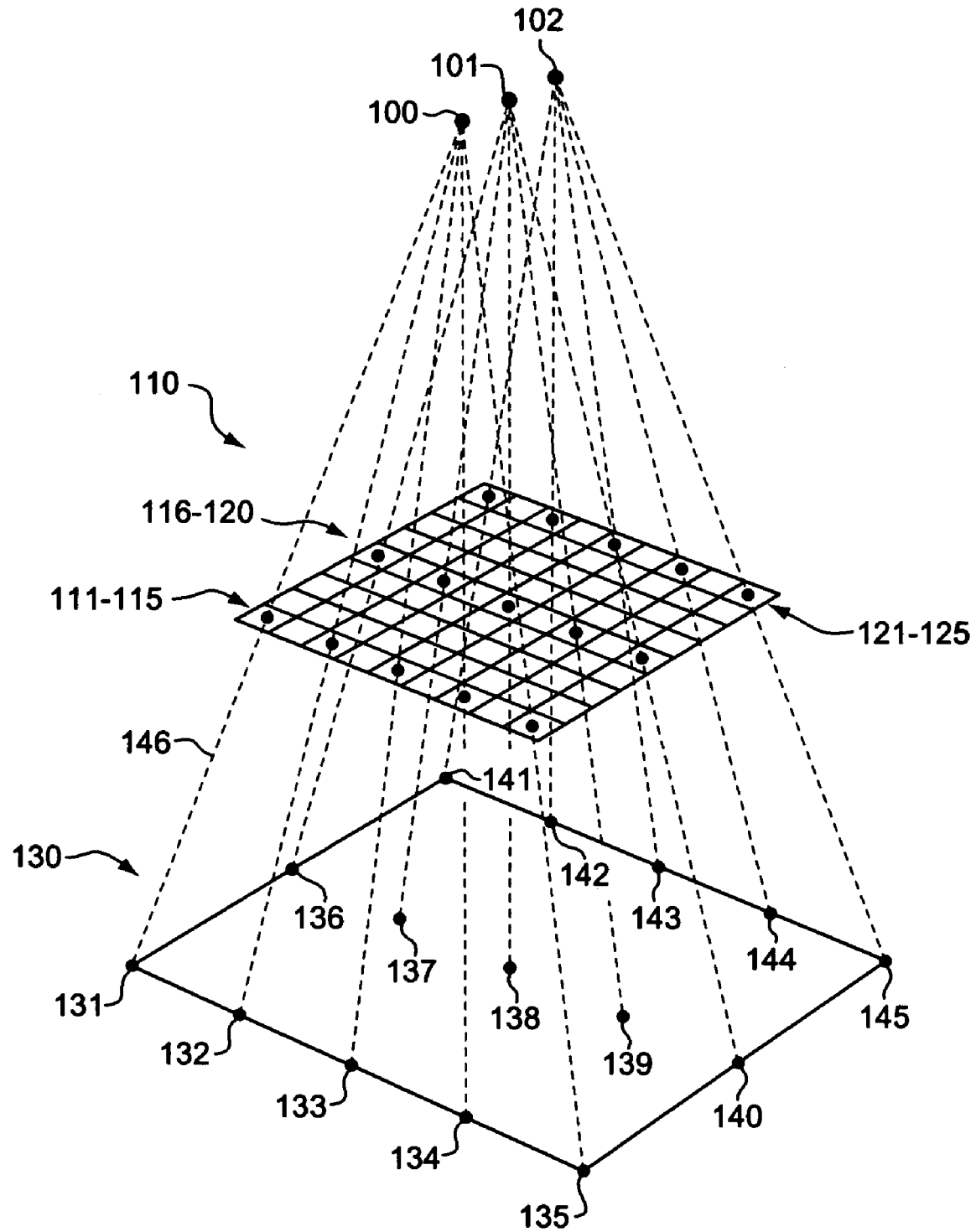
FIG. 1 illustrates an exemplary satellite image and corresponding camera and ground positions.

Because ASTER's VNIR subsystem is a pushbroom sensor, it collects image data one line at a time, as the Terra satellite orbits about the Earth. Depending on when the instrument's scanning begins and ends, the instrument acquires an image strip with a width of approximately 60 km and a length that is proportional to the time that elapses during the scan. Each strip is then divided into scenes of 60 km by 60 km. The geometry of one of these scenes 130 is shown in FIG. 1.

During acquisition of the scene 130, ASTER's VNIR subsystem moves from position 100 to position 101 to position 102. As it moves through these positions, its pushbroom sensor sweeps to acquire the image data represented by image surface 110.

Each pixel (i.e., small square) in image surface 110 corresponds to a particular point in scene 130. If the position, orientation, and interior geometry (e.g., focal length, principal point location, lens distortion, and other factors) of the camera are known, it is possible to calculate which pixel in the image 110 corresponds to which point in scene 130.

Sometimes, the interior geometry of a satellite sensor will be made publicly available or will be embodied in a physical camera model for the satellite sensor. However, a physical camera model is not readily available for ASTER's VNIR subsystem. Even if it were, such a model is not readily understood by most photogrammetric software packages (e.g., software packages for generating 3D images or DEMs). However, most photogrammetric software packages are capable of calculating ground-to-image (or scene-to-image) geometries using a Rational Polynomial Camera (RPC) model. The RPC model is a generic sensor model that can be used with a wide range of camera sensors. Use of the RPC model requires values for a set of rational polynomial coefficients. However, in order to generate rational polynomial coefficients, access to a camera's physical model is typically required.

The image data of ASTER's VNIR subsystem, along with metadata and coefficients required for radiometric and geometric corrections, is provided to a user in an HDF-EOS (Hierarchical Data Format for EOS) format file. The contents of such an HDF-EOS format file include:

for a lattice of points 111-125 corresponding to predetermined pixels in an ASTER VNIR image 110,
line and sample coordinates;
the latitude and longitude where a line-of-sight (LOS) vector (e.g., 146) through the pixel strikes the surface of the WGS84 reference ellipsoid;
the line-of-sight vector (roll, pitch and yaw);
satellite attitude and attitude rate;
position and velocity of the satellite; and
observation time for the lattice point.

The methods and apparatus disclosed below show how the above information may be used to generate rational polynomial coefficients in the absence of a physical camera model including knowledge of the interior geometry of a camera sensor.

Figure 2:
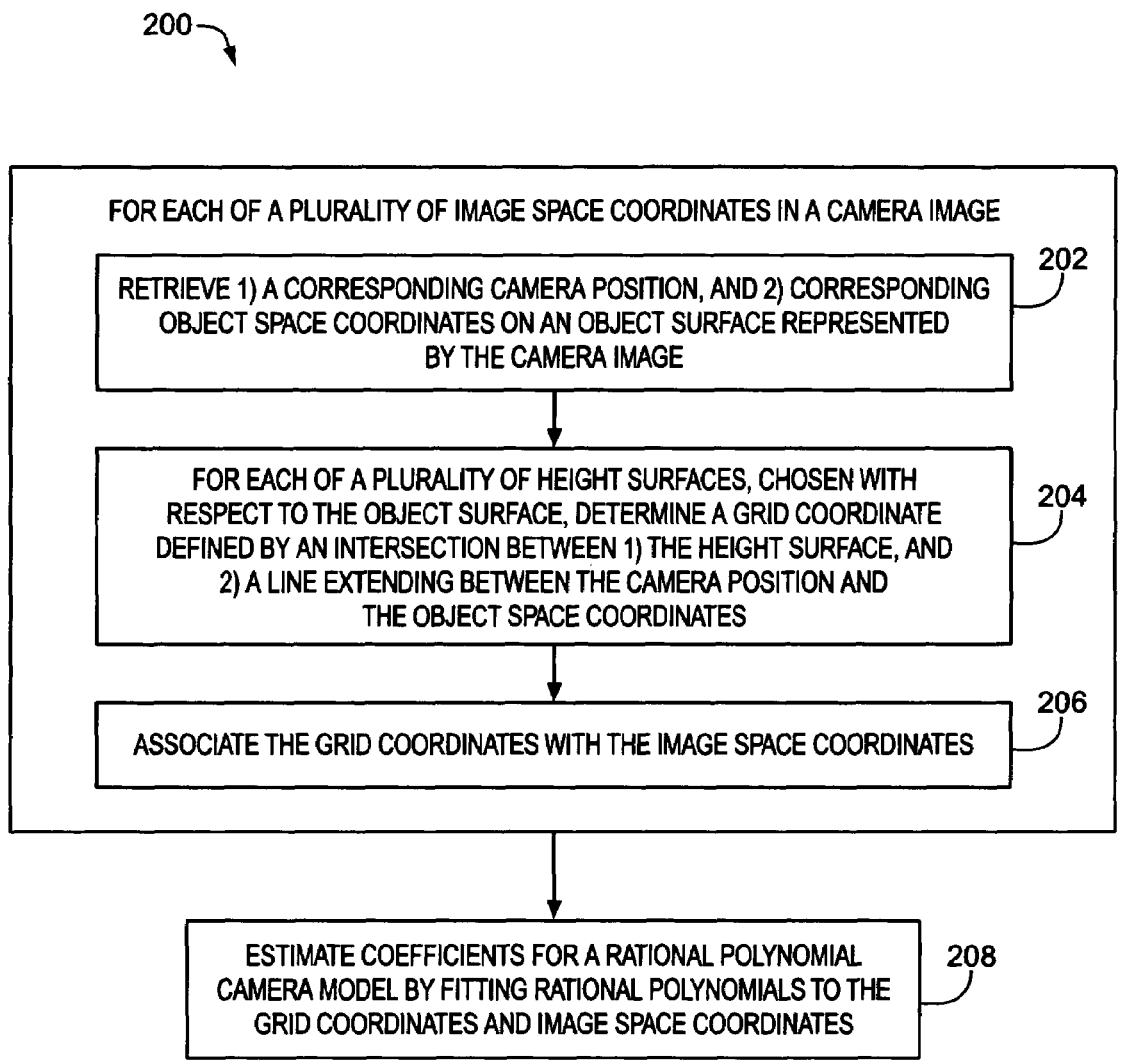
FIG. 2 illustrates a first exemplary method for estimating coefficients for a rational polynomial camera model.

FIG. 2 illustrates a method 200 wherein, for each of a plurality of image space coordinates (e.g., 111) in a camera image 110, 1) a corresponding camera position (e.g. 100), and 2) corresponding object space coordinates (e.g., 131) on an object surface 130 (e.g., the WGS84 reference ellipsoid) represented by the camera image 110 are retrieved 202. By way of example, the image space coordinates may be line and sample points (e.g., lattice points) in a satellite image such as an ASTER VNIR image band. The number of lattice points is fewer than the number of pixels in the satellite image.

Figure 3:
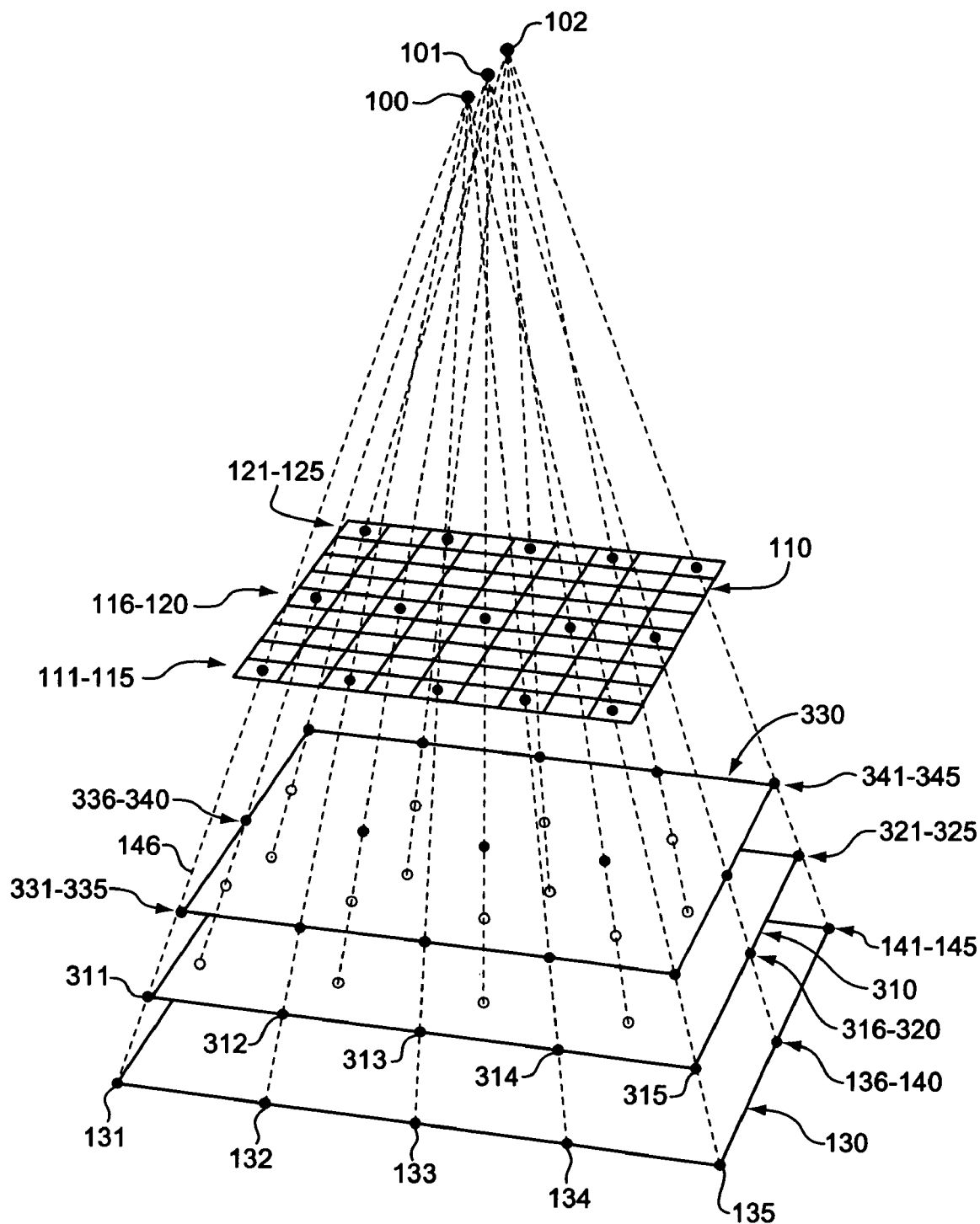
FIG. 3 illustrates a number of grid coordinates that can be generated for the FIG. 1 satellite image.

After retrieving the camera position and corresponding object space coordinates for a set of image space coordinates, grid coordinates (e.g., 311,331) defined by intersections between 1) a line (e.g., 146) extending between the camera position (e.g., 100) and object space coordinates (e.g., 131), and 2) a plurality of height surfaces 310, 330, are determined 204. The grid coordinates 311-325, 331-345 are then associated 206 with their corresponding image space coordinates 111-125. An exemplary set of height surfaces 310, 330, and the grid coordinates 311-325, 331-345 thereon, are shown in FIG. 3. The height surfaces 310, 330 are chosen with respect to the object surface 130, and may vary in number and spacing. The order of RPC model for which rational polynomial coefficients must be derived will determine the minimum number of height surfaces (which will likely be 5-10 height surfaces). Preferably, the height surfaces 310, 330 are chosen to lie within a range of expected feature heights on the object surface 130. The lines (e.g., 146) extending between the camera positions 100-102 and object space coordinates 131-145 are depicted in FIG. 3 as dashed lines.

After determination of the grid coordinates 311-325, 331-345, coefficients of a rational polynomial camera model are then estimated 208 by fitting rational polynomials to the grid coordinates 311-325, 331-345 and image space coordinates 111-125. Note that if a height surface in the grid has a height of "zero", then the object space coordinates 131-145 might also be considered part of the grid.

A number of different techniques may be used to estimate rational polynomial coefficients from a set of grid coordinates. Some of these techniques utilize a least squares algorithm. By way of example, a few exemplary techniques for estimating rational polynomial coefficients from a 3-dimensional set of grid coordinates are disclosed in the U.S. patent application of Dial, et al. entitled "Apparatuses and Methods for Mapping Image Coordinates to Ground Coordinates" (Publication No. 20030044085 A1). This application is hereby incorporated by reference for all that it discloses.

In the context of the ASTER VNIR subsystem, the camera positions and object space coordinates retrieved by the method 200 may be retrieved from a number of ASTER Level 1A (L1A) data granules. ASTER L1A data is data that has been reconstructed from ASTER Level 0 data (raw data) and consists of unprocessed instrument digital counts. Geometric and radiometric calibration coefficients are supplied with the L1A digital counts, but they are not applied to the L1A digital counts.

In L1A data granules, camera positions 100-102 are provided in Cartesian (X,Y,Z) coordinates, but object space coordinates 131-145 are provided as latitude and longitude pairs ($\phi,\lambda$) on the WGS84 reference ellipsoid. As a result, prior to determining a set of grid coordinates (e.g., 311, 331) corresponding to a set of object space coordinates (e.g., 131), the object space coordinates may be converted to Cartesian coordinates. Then, given that RPC models are typically constructed in terms of latitude, longitude and height values, each Cartesian grid coordinate may be converted back to a latitude, longitude and height ($\phi,\lambda,h$).

In one embodiment, the actions 202-208 of the method 200 are repeated for each image band of the ASTER VNIR subsystem.

A more specific application of the method 200, in the context of the ASTER VNIR subsystem, will now be described.

First, a list of line and sample (L,S) image coordinates 111-125, their corresponding satellite positions 100-102, and their corresponding latitude, longitude and height ($\phi,\lambda,h$) ground coordinates 131-145 may be built. This is done using the provided satellite 100-102 and ground positions 131-145 for the lattice of points 111-125 maintained in the metadata associated with a VNIR image band.

For each lattice point, the XYZ satellite position and the ($\phi,\lambda$) location where the ray strikes the reference ellipsoid define a straight line. This line is the line-of-sight (LOS) vector (e.g., 146) between the image 110 and the ground 130. For the purposes of estimation of Rational Polynomial coefficients, it is necessary to determine the ($\phi,\lambda$) positions of the ray at several different height surfaces 310, 330, as shown in FIG. 3. The resulting three-dimensional grid of line, sample, latitude, longitude, and height values 111-125, 311-325, 331-345 are later used as observations for the estimation of rational polynomial coefficients.

Figure 4:
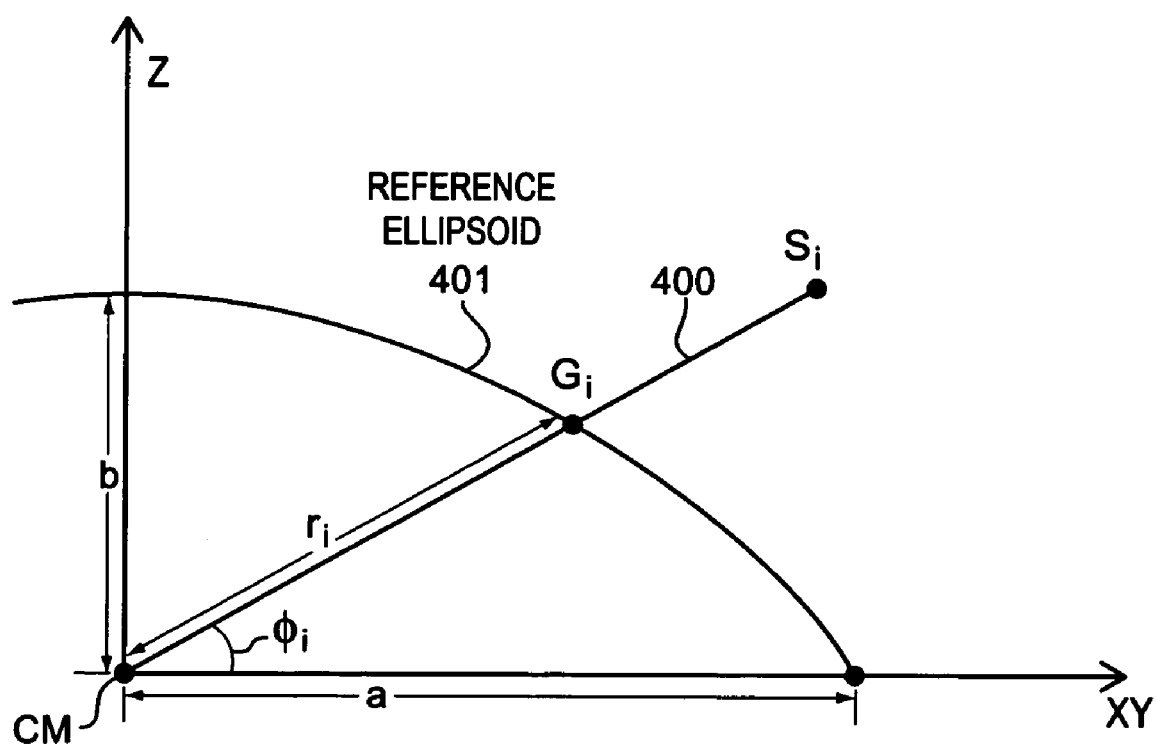
FIG. 4 illustrates a mathematical relationship between image space coordinates and object space coordinates.

To determine the latitude and longitude of different heights along the LOS vector 400, the position Gi where the LOS vector 400 strikes the reference ellipsoid 401 is preferably converted to Cartesian coordinates. This may be done as shown in FIG. 4 and described below, where:

$\phi_i$ = geocentric latitude of lattice point i, as given in ASTER sensor metadata;
$\lambda_i$ = longitude of lattice point i;
a = major semi-axis length of reference ellipsoid;
b = minor semi-axis length of reference ellipsoid;

$G_i$=intersection of LOS vector 400 with the surface of the reference ellipsoid 401;

$S_i$=satellite Center of Mass position corresponding to the lattice point i; and $r_i$=distance from earth's Center of Mass (CM) to $G_i$.

First, the Cartesian coordinates $(X_i, Y_i, Z_i)$ are calculated for point $G_i$, which is constrained to lie on the WGS84 reference ellipsoid 401, centered in the Earth-Centered Rotating (ECR) system:

$$r_i = \sqrt{\frac{a^2 b^2}{a^2 \sin^2 \phi_i + b^2 \cos^2 \phi_i}} \quad (1)$$

$$\begin{bmatrix} X_i \\ Y_i \\ Z_i \end{bmatrix}_G = \begin{bmatrix} r_i \cos\phi_i \cos\lambda_i \\ r_i \cos\phi_i \sin\lambda_i \\ r_i \sin\phi_i \end{bmatrix} \quad (2)$$

Next, the LOS vector 400 from $G_i$ to $S_i$ is computed:

$$\begin{bmatrix} \Delta X_i \\ \Delta Y_i \\ \Delta Z_i \end{bmatrix} = \begin{bmatrix} X_i \\ Y_i \\ Z_i \end{bmatrix}_S - \begin{bmatrix} X_i \\ Y_i \\ Z_i \end{bmatrix}_G \quad (3)$$

Finally, the LOS vector 400 may be converted to the unit vector:

$$\vec{e}_{GSi} = \frac{1}{\sqrt{\Delta X_i^2 + \Delta Y_i^2 + \Delta Z_i^2}} \begin{bmatrix} \Delta X_i \\ \Delta Y_i \\ \Delta Z_i \end{bmatrix} \quad (4)$$

Now we have $\vec{e}_{GSi}$, the LOS unit vector 400 from the ground to the satellite for lattice point i. For the estimation of rational polynomial coefficients, it is necessary to use $\vec{e}_{GSi}$ to compute the latitude and longitude of points at several heights along the LOS vector 400.

For each $H_j$, $j=0 \ldots n-1$, where n is the number of height surfaces, a latitude, longitude and height are calculated. Considering point $G_i$, having Cartesian coordinates $(X_i, Y_i, Z_i)$, the position of a point at $H_j$ is computed as follows:

a. Compute XYZ at $H_j$.

$$\begin{bmatrix} X \\ Y \\ Z \end{bmatrix}_{ij} = \begin{bmatrix} X_i \\ Y_i \\ Z_i \end{bmatrix}_G + H_j \cdot \alpha \cdot \vec{e}_{GSi}, \quad (5)$$

where $$\alpha = \frac{1}{\cos(31°)}$$

for VNIR Band3B (the band of the backward looking telescope) and $\alpha=1$ for VNIR Band1, VNIR Band2, and VNIR Band3N (the bands of the nadir looking telescope). VNIR Band3B is scaled differently because this telescope does not look straight down; it looks approximately 28° off-nadir. From the local vertical on the ground at this point, the sensor will be approximately 31° from zenith.

b. Convert $X_{ij}, Y_{ij}, Z_{ij}$ to latitude, longitude, and height ($\phi_{ij}, \lambda_{ij}, h_{ij}$).

Once the full set of ($\phi_{ij}, \lambda_{ij}, h_{ij}$) values have been determined for all the lattice points ($L_i, S_i$) 111-125 in the image 110 (FIG. 1), they can be used to estimate coefficients of the RPC model.

After RPC estimation, image data may be written to a TIFF format image file; and the rational polynomial coefficients may be written to an IKONOS format RPC text file. IKONOS format RPC files are preferable because this format is readable by most photogrammetric software packages. However, other file formats could be used for the image and rational polynomial coefficients depending on the application.

Figure 5:
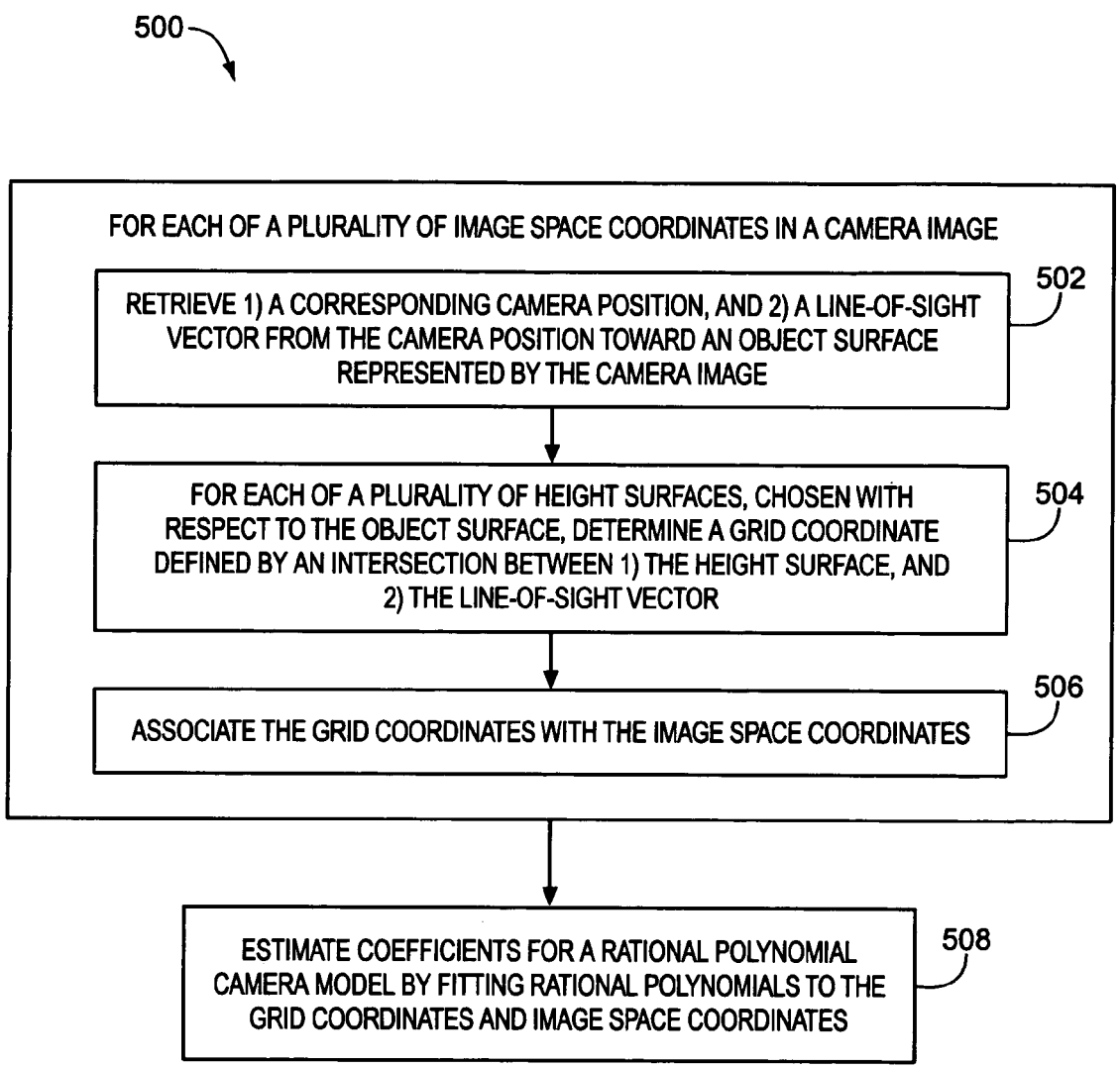
FIG. 5 illustrates a second exemplary method for estimating coefficients for a rational polynomial camera model.

FIG. 5 illustrates an alternate method 500 for estimating rational polynomial coefficients in the absence of a physical camera model. In accordance with the method 500, 1) a camera position (e.g., 100, FIG. 1), and 2) a line-of-sight vector (e.g., 146) from the camera position toward an object surface 130 represented by a camera image 110, are retrieved 502 for each of a plurality of image space coordinates (e.g., 111) in the camera image 110. By way of example, the image space coordinates may be line and sample points (e.g., lattice points) in a satellite image such as an ASTER VNIR image band. The line-of-sight vector may be provided in orbital coordinates (e.g., roll, pitch and yaw).

After retrieving the camera position and line-of-sight vector for a set of image space coordinates, grid coordinates (e.g., 311, 331) defined by intersections between 1) the line-of-sight vector (e.g., 146) and a plurality of height surfaces 310, 330 are determined 504. The grid coordinates 311-325, 331-345 are then associated 506 with their corresponding image space coordinates 111-125. An exemplary set of height surfaces 310, 330, and the grid coordinates 311-325, 331-345 thereon, are shown in FIG. 3. The line-of-sight vectors (e.g., 146) are depicted in FIG. 3 as dashed lines.

After determination of the grid coordinates 311-325, 331-345, coefficients of a rational polynomial camera model are then estimated 508 by fitting rational polynomials to the grid coordinates 311-325, 331-345 and image space coordinates 111-125. Note that, if a height surface in the grid has a height of "zero", then the object space coordinates 131-145 might also be considered part of the grid.

The method 500 may be modified and expanded similarly to the method 200.

In the foregoing description, and for purposes of illustration, method actions were described in a particular order. In alternate embodiments, the actions of the methods might be performed in different orders. Additionally, the methods 200, 500 described above may be embodied in sequences of machine-executable instructions which, when executed by a machine, cause the machine to perform the actions of the methods. The machine that executes the instructions may be a general-purpose or special-purpose processor, or logic circuits programmed with the necessary instructions to perform the methods. By way of example, the machine-executable instructions may be stored on a number of machine-readable media, such as CD-ROMs or other type of optical disks, floppy diskettes, ROMs, RAMs, EPROMs, EEPROMs, magnetic or optical cards, flash memory, or other types of machine-readable media that are suitable for storing electronic instructions. It is also noted that the methods disclosed herein could be performed by a combination of both hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer readable medium having stored thereon sequences of instructions which, when executed by a computer, cause the computer to perform the actions of:
for each of a plurality of image space coordinates in a camera image,
retrieving i) a corresponding camera position, and ii) corresponding object space coordinates on an object surface represented by said camera image;
for each of 5-10 height surfaces, chosen with respect to said object surface, determining a grid coordinate defined by an intersection between i) the height surface, and ii) a line extending between said camera position and said object space coordinates; and
associating said grid coordinates with said image space coordinates; and
estimating coefficients for a rational polynomial camera model by fitting rational polynomials to at least said grid coordinates and image space coordinates.

2. The computer readable medium of claim 1, wherein the image space coordinates of the camera image are line and sample coordinates in a satellite image.

3. The computer readable medium of claim 2, wherein the line and sample coordinates of the satellite image correspond to a lattice of points, said number of lattice points being fewer than the number of pixels in said satellite image.

4. The computer readable medium of claim 2, wherein the satellite image is an ASTER VNIR image band.

5. The computer readable medium of claim 2, wherein said camera positions and object space coordinates are retrieved from a number of ASTER L1A data granules.

6. The computer readable medium of claim 1, wherein the object surface is a reference ellipsoid.

7. The computer readable medium of claim 1, wherein said retrieved camera positions are provided in Cartesian coordinates; wherein said object surface is a reference ellipsoid; and wherein said object space coordinates are provide as latitude and longitude pairs on said reference ellipsoid; the instructions further causing the computer to perform the actions of:
prior to determining said grid coordinates, converting said object space coordinates to Cartesian coordinates; and
after determining a grid coordinate, converting the grid coordinate to a latitude, longitude and height.

8. The computer readable medium of claim 1, wherein said fitting is accomplished using a least squares algorithm.

9. A computer readable medium having stored thereon sequences of instructions which, when executed by a computer, cause the computer to perform the actions of:
for each of a plurality of image space coordinates in a camera image that are line and sample coordinates in a satellite image, which is an ASTER VNIR image band,
retrieving i) a corresponding camera position, and ii) corresponding object space coordinates on an object surface represented by said camera image;
for each of a plurality of height surfaces, chosen with respect to said object surface, determining a grid coordinate defined by an intersection between i) the height surface, and ii) a line extending between said camera position and said object space coordinates; and
associating said grid coordinates with said image space coordinates; and
estimating coefficients for a rational polynomial camera model by fitting rational polynomials to at least said grid coordinates and image space coordinates, wherein the instructions cause the actions to be repeated for each image band of the ASTER VNIR subsystem.

10. A computer readable medium having stored thereon sequences of instructions which, when executed by a computer, cause the computer to perform the actions of:
for each of a plurality of image space coordinates in a camera image,
retrieving i) a corresponding camera position, and ii) a line-of-sight vector from the camera position toward an object surface represented by said camera image;
for each of 5-10 height surfaces, chosen with respect to said object surface, determining a grid coordinate defined by an intersection between i) the height surface, and ii) said line-of-sight vector; and
associating said grid coordinates with said image space coordinates; and
estimating coefficients for a rational polynomial camera model by fitting rational polynomials to at least said grid coordinates and image space coordinates.

11. The computer readable medium of claim 10, wherein the image space coordinates of the camera image are line and sample points in a satellite image.

12. The computer readable medium of claim 11, wherein the line and sample points of the satellite image correspond to a lattice of points, said number of lattice points being fewer than the number of pixels in said satellite image.

13. The computer readable medium of claim 11 wherein the satellite image is an ASTER VNIR image band.

14. The computer readable medium of claim 11, wherein said camera positions and line-of-sight vectors are retrieved from a number of ASTER L1A data granules.

15. The computer readable medium of claim 10, wherein the object surface is a reference ellipsoid.

16. The computer readable medium of claim 10, wherein said line of sight vectors are provided in orbital coordinates, the instructions further causing the computer to perform the action of:
converting said line of sight vectors to Cartesian coordinates.

17. The computer readable medium of claim 10, wherein said retrieved camera positions are provided in Cartesian coordinates; wherein said object surface is a reference ellipsoid; the instructions further causing the computer to perform the action of:
after determining a grid coordinate, converting the grid coordinate to a latitude, longitude and height.

18. The computer readable medium of claim 10, wherein said fitting is accomplished using a least squares algorithm.

19. A computer readable medium having stored thereon sequences of instructions which, when executed by a computer, cause the computer to perform the actions of:
for each of a plurality of image space coordinates in a camera image that are line and sample coordinates in a satellite image, which is an ASTER VNIR image band,
retrieving i) a corresponding camera position, and ii) a line-of-sight vector from the camera position toward an object surface represented by said camera image;
for each of a plurality of height surfaces, chosen with respect to said object surface, determining a grid coordinate defined by an intersection between i) the height surface, and ii) said line-of-sight vector; and
associating said grid coordinates with said image space coordinates; and
estimating coefficients for a rational polynomial camera model by fitting rational polynomials to at least said grid coordinates and image space coordinates, wherein the instructions cause the actions to be repeated for each image band of the ASTER VNIR subsystem.

* * * * *